United States Patent [19]

Faltermeier

[11] Patent Number: 4,889,426

[45] Date of Patent: Dec. 26, 1989

[54] MICROSCOPE PHOTOMETER TUBE

[75] Inventor: Bernd Faltermeier, Aalen, Fed. Rep. of Germany

[73] Assignee: Carl-Zeiss-Stiftung, Fed. Rep. of Germany

[21] Appl. No.: 260,830

[22] Filed: Oct. 21, 1988

[30] Foreign Application Priority Data

Oct. 22, 1987 [DE] Fed. Rep. of Germany ....... 3735784

[51] Int. Cl.$^4$ .................... G02B 21/18; G01N 21/59
[52] U.S. Cl. .................................... 356/432; 350/442; 350/444; 350/446; 350/511; 356/219; 356/225
[58] Field of Search ............... 356/72, 432, 218, 219, 356/225; 350/511, 442, 444, 445, 446

[56] References Cited

U.S. PATENT DOCUMENTS 3,421,806  1/1969  Weber .................... 356/432 X
3,887,283  6/1975  Merstallinger et al. ........ 350/511 X
4,712,889  12/1987  Schindl .................... 356/219 X Primary Examiner—Vincent P. McGraw
Attorney, Agent, or Firm—Stonebraker, Shepard & Stephens

[57] ABSTRACT

A photometer tube for microscopes is provided with a device by means of which the measurement field diaphragm of the photometer is superimposed on the intermediate image of the object in the binocular tube. For the reflecting-back of the measurement field diaphragm, which is illuminated from the rear, into the binocular tube, the residual reflection of an uncoated glass-air interface in the ray path between the objective and the beam divider of the microscope is utilized. This surface may be one of the surfaces of the tube lens systems of the microscope.

15 Claims, 2 Drawing Sheets

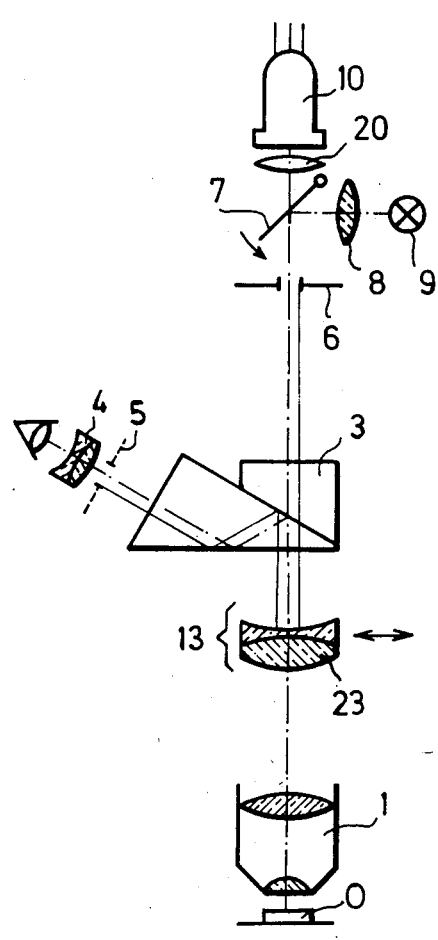
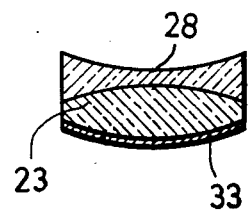
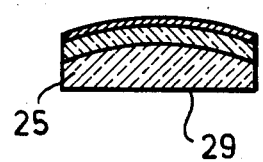
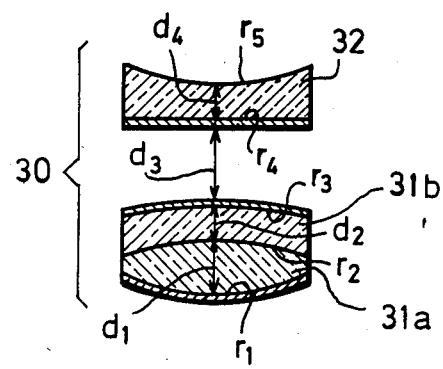

MICROSCOPE PHOTOMETER TUBE

BACKGROUND OF THE INVENTION

This invention relates to a photometer tube for a microscope, having a prism which divides the ray path coming from the objective of the microscope between the eyepiece or ocular of the microscope and a photoelectric receiver, and also having a measurement diaphragm arranged in front of the photoelectric receiver, and means for reflecting an image of the measurement diaphragm back into the eyepiece.

Such photometer tubes are known, for instance, from U.S. Pat. No. 3,421,806 issued Jan. 14, 1969, Weber; Swiss Pat. No. 615,762 and its corresponding British Pat. No. 1,582,346 published Jan. 7, 1981, Leitz; and German Fed. Rep. Pat. No. 3,443,728 and its corresponding English language European patent application published June 4, 1986 (Bulletin 86/23) as publication 0,183,416 A2, Shindl. The means for reflecting the measurement diaphragm serves to make the object being viewed and the measurement diaphragm simultaneously visible to the viewer in the binocular tube. For this purpose, an image of the rear-illuminated measurement diaphragm is focused superimposed on the intermediate image of the object in the binocular tube.

In the apparatus mentioned above with reference to the state of the art, the focusing of the measurement field diaphragm into the binocular tube is effected in the manner that behind a second and generally unused exit of the divider prism there is mirror optics which produces a preferably upright and laterally correct image of the measurement field diaphragm on itself and into the intermediate image plane conjugated with the plane of the mesurement field diaphragm within the binocular tube. For this purpose, corner mirrors or plane mirrors with a focusing optical system in front thereof are used.

These known solutions have the disadvantage that they require a relatively large number of optical components. In addition, there is required a divider prism having two exits and space for arranging the components of the return-reflection means behind the second exit of the prism. But such space is frequently not available. It is therefore not readily possible, when using these known solutions, to re-equip already existing tubes as photometer tubes.

SUMMARY OF THE INVENTION

The object of the present invention is to create a return mirroring device for a photometer tube which is of the simplest construction possible and which can be readily installed even in already existing tubes.

This object is achieved by providing, for the return reflection of the measurement diaphragm, a partially mirrored surface or an uncoated surface which is arranged in front of the objective-side entrance of the divider prism and from which the measurement diaphragm is imaged on itself in autocollimation.

This solution has the advantage that no second exit of the divider prism is required. There is merely required a single partially mirrored surface or an uncoated surface which can be arranged in any microscope without difficulty within the ray paths between the objective and the divider prism of the microscope. In this way, even existing tubes can easily be refitted for microscope photometry in such a manner that the measurement diaphragm becomes visible in the image of the object being viewed.

When using this solution, it is not possible to obtain an upright and laterally correct image of the measurement field diaphragm. Therefore, the surface used for the reflecting back and/or the reflected image of the measurement diaphragm must be adjustable with respect to the diaphragm itself. However, the disadvantage of these circumstances is more than compensated by the advantage that, at most, only a single additional optical element is required for the reflecting back of the measurement diaphragm, and in some embodiments no additional optical element at all is required. In microscopes which have a tube lens, or a tube lens system, for producing the intermediate image, it is possible to utilize one of the surfaces of the tube lens (or lens system) which is already present, for the reflecting back of the measurement field diaphragm.

It has been found that, in order to make the measurement diaphragm visible in the binocular tube with sufficient contrast, only a very small reflection factor on the reflecting surface is needed. For example, the natural reflection in an amount of about 4% of the incident light which is in any event present on an uncoated glass-air interface is entirely sufficient for this purpose.

Other advantages of the invention will become evident from the detailed description which follows.

BRIEF DESCRIPTION OF THE DRAWINGS

FIG. 3 is a similar sketch illustrating a third embodiment in which the microscope has a tube lens;

FIG. 4 is an enlarged showing of the tube lens of FIG. 3;

FIG. 5 shows an alternative embodiment of the tube lens of FIG. 4; and

FIG. 6 illustrates a particularly advantageous embodiment of a tube lens system which can be used instead of the tube lens of FIG. 3.

DETAILED DESCRIPTION

Figure 1:
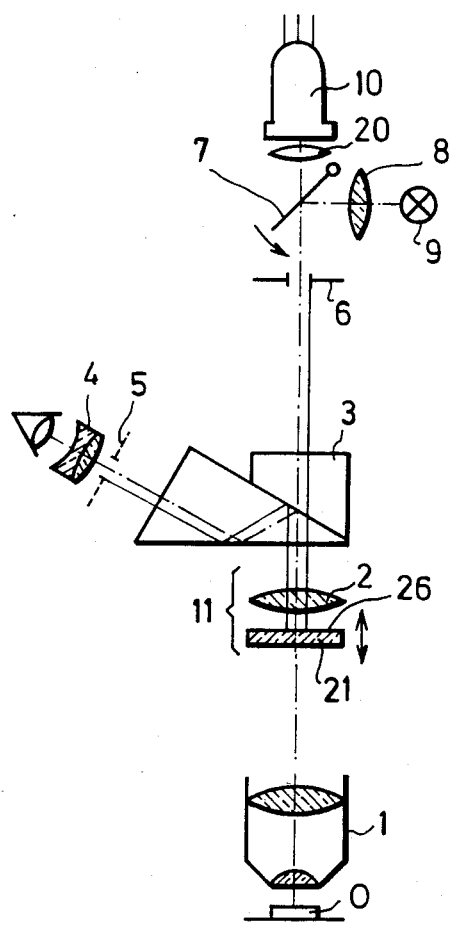
FIG. 1 is a basic sketch of the ray path in a microscope with photometer tube, in accordance with a first embodiment of the invention.
Figure 2:
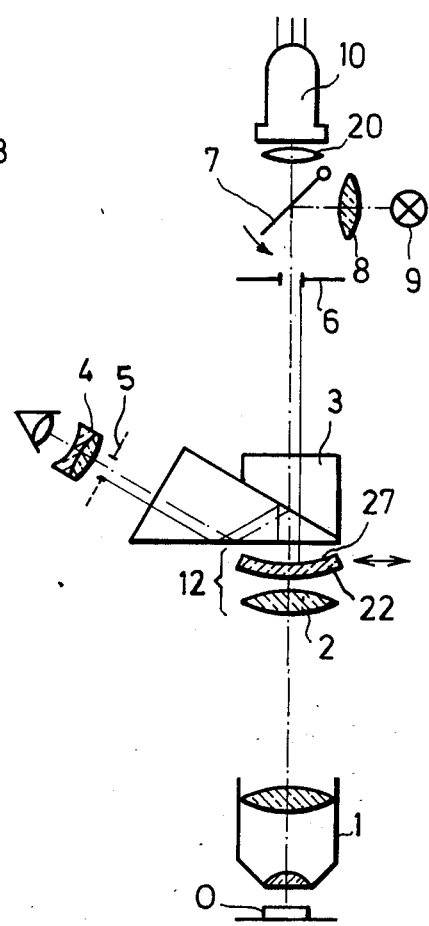
FIG. 2 is a similar sketch illustrating a second embodiment.

Each of FIGS. 1 to 3 shows the entire ray path of the most essential parts of a microscope photometer. Since the ray paths up to the regions which have been bracketed as 11, 12, and 13 are identical in these three embodiments, a description based on FIG. 1 will be sufficient also for the corresponding parts of FIGS. 2 and 3.

The microscope photometer of FIG. 1 has an objective 1 for focusing the object 0 to be photometered. The objective 1 has an exit back focus which is calculated to infinity and which, together with a tube lens 2, produces an intermediate image 5 of the object which the viewer observes by means of the eyepiece or ocular 4.

In the ray path between the eyepiece 4 and the tube lens 2 there is a divider prism 3 which permits the greatest part of the light coming from the objective 1 to pass in the direction toward a measurement field diaphragm 6 arranged behind the same. Only about 20% of the light is reflected on the divider surface of the prism 3 and coupled out after further deflection into the eyepiece 4.

The measurement field diaphragm 6 lies in a plane which is conjugated to the intermediate image 5. The measurement field diaphragm 6 is followed by a swing mirror 7 which, in the position shown, reflects the light of an auxiliary illumination ray path consisting of an incandescent bulb 9 and a light collector 8 onto the measurement field diaphragm 6 and thus illuminates it from the rear. During the actual photometric measurement, the swing mirror 7 is swung away so that the light coming from the objective 1 and passing through the measurement field diaphragm 6 strikes the photomultiplier 10. In front of the photomultiplier 10 there is an auxiliary lens 20, which serves to focus the objective exit pupil on the photocathode of the multiplier 10.

For the reflecting of the illuminated measurement field diaphragm 6 back into the intermediate image plane 5 within the binocular tube, there is provided a plane-parallel plate 21 which is inserted into the ray path on the objective side in front of the tube lens 2. The side of the plane-parallel plate facing the tube lens 2 is uncoated. This glass-air interface 26 reflects about 4% of the light coming from the measurement field diaphragn which strikes the plate 21. Since the plate 21 is arranged below the lens tube, the measurement field diaphragm 6 is focused by the reflection on the surface 26 of the plane-parallel plate 21 on itself in autocollimation and, as a result of the splitting of the beam in the prism 3, is superimposed on the intermediate image 5 and is therefore visible to the observer in the image of the object 0.

The plane-parallel plate 21 is tiltable, as indicated by the corresponding arrows, so as to permit adjustment of the measurement field diaphragm 6, which is imaged upside down and laterally inverted on the intermediate image 5 and on itself. The objective-side surface of the plane-parallel plate 21 is coated in the same way as the entire rest of the optical system of the apparatus. The non-coating of this one surface 26 in the imaging ray path has no substantial influence on the quality of the microscope imaging of the object 0.

In the embodiment of FIG. 2, instead of the plane-parallel plate 21 in front of the tube lens 2 on the objective side, an afocal meniscus 22 is inserted between the tube lens 2 and the beam divider 3. The eyepiece-side surface 27 of this meniscus is uncoated or is covered with a slightly reflection-increasing layer having a reflection factor of, for instance, 10%, while the objective-side surface of the meniscus is again coated. The radius of curvature of the meniscus 22 corresponds to the optical path length between the measurement diaphragm 6 and the surface 27, so that the concave mirror formed by the surface 27 with its residual reflection of 4% focuses the measurement field diaphragm 6 again on itself and into the intermediate image plane 5. For the adjustment of the diaphragm image, the meniscus 27 is displaceable or tiltable perpendicular to the optical axis of the miscroscope.

In the embodiments shown in FIGS. 1 and 2, a tube which, for instance, is already present is equipped for the reflecting back of the measurement diaphragm in the manner that a simple optical component is additionally inserted in front of or behind the tube lens 2. In this connection it should furthermore be noted that the solution shown in FIG. 2 is suitable also for microscopes with objectives of finite exit back-focus which do not use a tube lens for the production of the intermediate image since in the embodiment of FIG. 2 the tube lens is not required for the reflecting back of the measurement field diaphragm 6.

An embodiment for microscopes with tube lenses is shown in FIG. 3. In this embodiment, the eyepiece-side concave surface of the tube lens 23 is utilized for the reflecting back of the diaphragm 6 and no further component is required for this purpose. The showing of the tube lens 23, which is shown on an enlarged scale and in greater detail in FIG. 4, shows that the eyepiece-side surface 28 is uncoated while the objective-side surface as well as the rest of the optical system of the microscope is covered by a coating layer 33. The tube lens 23 is a cemented component consisting of two elements L1 and L2, and has a focal length of 160 mm, i.e. the intermediate image formed by the objective 1 and the tube lens 23 is produced within this distance. The radius of the uncoated surface of the tube lens is also 160 mm, so that the reflection of about 4% of the light intensity produced on this glass-air surface images the measurement field diaphragm into the intermediate image plane 5.

Already existing tubes without possibility of return reflection can therefore be refitted, for instance, in the manner that the previous tube lens is replaced by a tube lens which is provided with a special eyepiece-side radius which is adapted to the focal length of the system, and that this surface is uncoated.

Here also it is advisable to install the tube lens, as indicated by the arrow, in an adjustment mount which can be centered or tilted.

As an alternative to the tube lens 23 shown in FIG. 4, the planoconvex tube lens 25 shown in FIG. 5 can also be used. In the tube lens 25 the objective-side flat surface 29 is uncoated. This surface acts with respect to the reflection in the same way as the flat surface 26 in the embodiment of FIG. 1.

FIG. 6 shows a particularly advantageous embodiment for a multilens tube lens system which can be used instead of the tube lens 23. The tube lens system 30 consists of a biconvex cemented component 31 and an eyepiece-side planoconcave lens 32. While the glass-air interfaces r1, r3, and r4 are coated as previously, the concave surface r5 of the lens 32 is uncoated. The radius r5 of this surface is so selected in a value of 160.79 mm that the reflection produced there focuses the measurement field diaphragm into the plane in which the tube lens system 30 produces the intermediate image of the object.

The data for the lens system shown in FIG. 6 are given in the following table, using the conventional designations as commonly used in lens patents.

| Component | Radii | Thicknesses and spacings | Index of refraction | Abbe number |
|---|---|---|---|---|
| 31a | r1 = 124.09 mm | d1 = 3.5 mm | 1.50137 | 56.41 |
| 31b | r2 = −29.00 mm | d2 = 2.5 mm | 1.62588 | 35.70 |
|  | r3 = −66.355 mm | d3 = 1.3 mm |  |  |
| 32 | r4 = ∞ | d4 = 2.5 mm | 1.52249 | 59.48 |
|  | r5 = 160.79 mm |  |  |  |

The division of the tube lens 30 into a biconvex component 31a, 31b and a planoconcave component 32 has several advantages. Since the main contribution to the refractive power of the system is provided by the biconvex component 31a, 31b, the latter can be so adjusted that the intermediate image is produced at the place provided for this in the tube. The adapting of the reflection of the measurement field diaphragm can then be effected by moving the planoconcave component 32, without the position of the intermediate image being influenced thereby. This advantage is also offered by the embodiment of FIG. 2, in which the tube lens 2 and the afocal meniscus 22 can be moved independently of each other in order to adapt the plane of the intermediate image and the reflection of the measurement field diaphragm.

However, double images of the measurement field diaphragm can be produced there if the convex surface of the meniscus 22 is not sufficiently well coated, its radius corresponding to that of the concave surface 27. This is dependably avoided in the embodiment of FIG. 6 since neither the flat surface r4 nor the other surfaces r1, r2, and r3 of the cemented component produce reflections in the vicinity of the intermediate image plane.

The solution of FIG. 6 also has the advantage, as do the embodiments of FIGS. 2, 3, and 4, that no chromatic errors can be produced upon the imaging of the measurement field diaphragm since the tube lens is not used for the return reflection path.

What is claimed is:

1. A photometer tube comprising an objective (1), an eyepiece (4), a photoelectric receiver (10), a measurement diaphragm (6) arranged in front of said photoelectric receiver, prism means (3) for dividing a light ray coming from said objective to direct a portion of said ray to said eyepiece and a portion of said ray to said photoelectric receiver, and reflecting means for reflecting an image of said measurement diaphragm back into said eyepiece, said reflecting means comprising a reflecting surface (26, 27, 28, 29, r5) arranged in the path of said ray between said objective and said prism means.

2. A photometer tube as defined in claim 1, wherein said reflecting surface is a partially mirrored surface.

3. A photometer tube as defined in claim 1, wherein said reflecting surface is an uncoated surface.

4. A photometer tube as defined in claim 1, wherein said reflecting surface (26, 27) is on an additional optical element (21, 22) introduced in said ray path between said objective and said prism means.

5. A photometer tube as defined in claim 4, wherein said additional optical element is a plane-parallel plate (21) arranged between said objective and a tube lens system of the microscope.

6. A photometer tube as defined in claim 4, wherein said additional optical element is an afocal meniuscus (22) placed directly in front of the entrance of said prism means.

7. A photometer tube as defined in claim 1, wherein said microscope has a tube lens system (23, 25, 30), and wherein said reflecting surface is one of the surfaces (28, 29, r5) of said tube lens system.

8. A photometer tube as defined in claim 7, wherein said reflecting surface is an ocular-side concave surface (28, r5) of said tube lens system.

9. A photometer tube as defined in claim 7, wherein said tube lens system (30) includes a planoconcave lens (32) a surface of which is partially mirrored or uncoated to act as said reflecting surface.

10. A photometer tube as defined in claim 8, wherein the radius of curvature (28, r5) of said concave reflecting surface is substantially equal to the focal length of said tube lens system.

11. A photometer tube as defined in claim 7, wherein said reflecting surface is an objective-side flat surface (29) of said tube lens system (25).

12. A photometer tube as defined in claim 1, wherein said reflecting surface is arranged on a structural part which is contained in an adjustable manner in the tube of the microscope and is adjustable in a centerable or tiltable manner.

13. A microscope for photometric measurements comprising an objective (1), an eyepiece (4), a photoelectric receiver (10), a measurement diaphragm (6) arranged in front of said receiver, a prism (3) for dividing a light ray path coming from said objective between said eyepiece and said receiver, a tube lens system which, together with said objective, focuses an object (0) to be examined into an intermediate image plane (5) in the binocular tube and onto said measurement diaphragm, and means for reflecting said measurement diaphragm back into the binocular tube, said tube lens system (11, 12, 13, 23, 25, 30) being provided with an uncoated surface (26, 27, 28, 29, r5) from the reflection of which said measurement diaphragm is focused on itself in autocollimation.

14. A microscope as defined in claim 13, wherein the reflection factor of said surface is less than 0.1.

15. A photometer tube comprising a tube lens system having a plurality of components, the characteristics of said components being substantially in proportion to the characteristics set forth in the following table:

| Component | Radii | Thicknesses and spacings | Index of refraction | Abbe number |
| --- | --- | --- | --- | --- |
| 31a | r1 = 124.09 mm | d1 = 3.5 mm | 1.50137 | 56.41 |
| 31b | r2 = −29.00 mm | d2 = 2.5 mm | 1.62588 | 35.70 |
|  | r3 = −66.355 mm | d3 = 1.3 mm |  |  |
| 32 | r4 = ∞ | d4 = 2.5 mm | 1.52249 | 59.48 |
|  | r5 = 160.79 mm |  |  |  |

* * * * *